(12) United States Patent
Tsai et al.

(10) Patent No.: US 7,993,788 B2
(45) Date of Patent: Aug. 9, 2011

(54) FUEL CELL MEASUREMENT APPARATUS

(75) Inventors: Chun-Huang Tsai, Taoyuan County (TW); Chang-Sing Hwang, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 385 days.

(21) Appl. No.: 12/418,287

(22) Filed: Apr. 3, 2009

(65) Prior Publication Data

US 2010/0253356 A1    Oct. 7, 2010

(51) Int. Cl.
*H01M 8/04* (2006.01)
*H01M 8/00* (2006.01)

(52) U.S. Cl. ........ 429/430; 429/431; 429/432; 429/400; 429/428

(58) Field of Classification Search .................... 429/430
See application file for complete search history.

(56) References Cited

U.S. PATENT DOCUMENTS

| | | | | |
|---|---|---|---|---|
| 7,670,700 | B2 * | 3/2010 | Imamura et al. | 429/483 |
| 7,767,327 | B2 * | 8/2010 | Ko et al. | 429/429 |
| 2004/0095127 | A1 * | 5/2004 | Mohri et al. | 324/117 R |
| 2011/0123892 | A1 * | 5/2011 | Hilliard | 429/458 |

OTHER PUBLICATIONS

K. Ahmed, J. Gamman, K. Foger; Demonstration of LPG-fueled solid oxide fuel cell systems; Solid State Ionics 152-153 (2002) p. 485-492; www.elsevier.com/locate/ssi.
S.C. Singhal; Advances in solid oxide fuel cell technology, Solid State Ionics 135 (2000) p. 305-313; www.elsevier.com/locate/ssi.
II.Peters and H.H.Muhius, Elektrochemische Untersuchung der glcichgewichte, Jun. 27, 1958; p. 298-309.

* cited by examiner

*Primary Examiner* — Edward Tso
*Assistant Examiner* — Ahmed Omar
(74) *Attorney, Agent, or Firm* — WPAT, PC; Justin King (57) ABSTRACT

A fuel cell measurement apparatus capable of measuring electric characteristics of a solid oxide fuel cell is provided. The fuel cell measurement apparatus comprises a first current collecting unit, a second current collecting unit, a top holding set, a bottom holding set and an adjustable elastic load set. The solid oxide fuel cell is clipped by the first current collecting unit fixed by the top holding set and the second collection unit fixed by the bottom holding set. The adjustable elastic load set is capable of adjusting the tension between the top holding set and the bottom holding set. The first (second) current collecting unit comprises a first (second) conductive mesh and a first (second) porous plate having a first (second) through hole and a first (second) gas channel communicating with each other, wherein the first (second) conductive mesh is sintered on the first (second) porous plate.

21 Claims, 9 Drawing Sheets

FUEL CELL MEASUREMENT APPARATUS

BACKGROUND OF THE INVENTION

1. Field of the Invention

The present invention generally relates to a cell measurement apparatus and, more particularly, to a fuel cell measurement apparatus capable of measuring electric characteristics of a solid oxide fuel cell.

2. Description of the Prior Art

The solid oxide fuel cell (SOFC) is a clean energy conversion system, in which electrochemical reaction is used for power generation so as to convert chemical energy to electrical energy without combustion to prevent the environment from being polluted by carbon dioxide ($CO_2$) and nitrogen oxide ($NO_x$). Considering oil exhaustion and global warming, the solid oxide fuel cell has become a potential candidate as a clean alternative energy.

However, the solid oxide fuel cell has not been commercialized because the manufacturing cost is too high. Therefore, it is crucial to reduce its cost by material selection, cell design, or cell manufacturing.

Moreover, the measurement apparatus and technology for cell analysis, manufacturing quality control and commercialization evaluation are some important factors for developing the solid oxide fuel cell. Presently, there are two approaches for measuring electric characteristics and electrochemistry of a cell. One is by single cell measurement and the other is by multi-cell measurement. Considering multi-cell measurement, referring to S. C. Singhal, Solid State Ionics, 135 (2000) 305 and K. Ahmed, J. Gamman and K. Foger, Solid State Ionics, 152-153 (2002) 485, additional equipments are added to the system to integrate multiple cells as a cell stack and the system, which leads to very high cost.

The cell stack is assembled with time-consuming work, complicated elements, and high material cost. Moreover, the system is susceptible to the quality of these elements so that it is difficult to identify the manufacturing quality and explain the measured results to cause a mistake to mislead the research direction and hence extend the time to market. Therefore, it is advantageous to utilize single cell measurement to measure electric characteristics of the solid oxide fuel cell. Single cell measurement is a simple approach to the research of the solid oxide fuel cell. The leading institutes such as DOE, VTT, FZJ and ECN consider single cell measurement as an important step of cell quality control.

Figure 1:
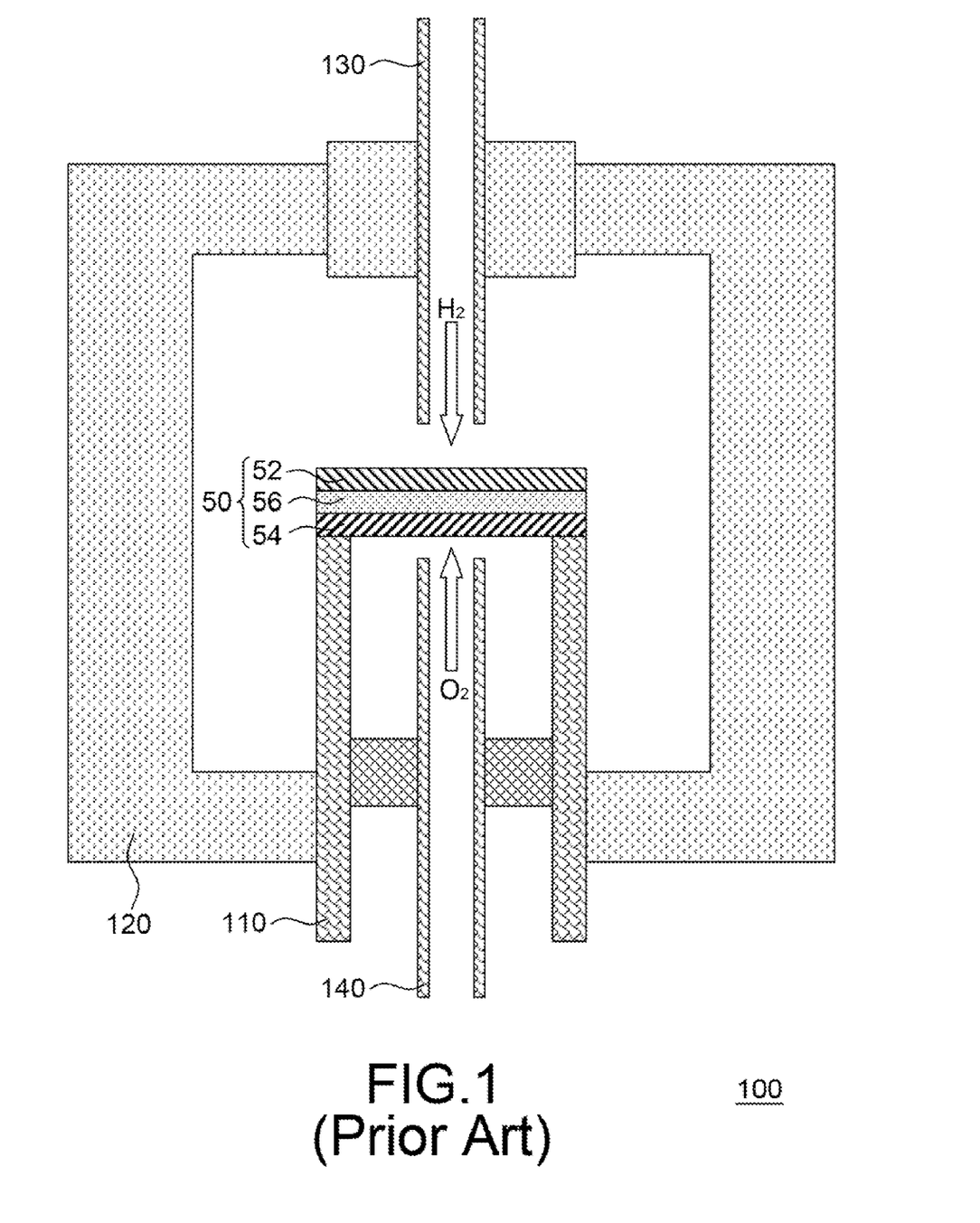
FIG. 1 is a cross-sectional view of a conventional fuel cell measurement apparatus.

FIG. 1 is a cross-sectional view of a conventional fuel cell measurement apparatus (with reference to H. Peters and H. H. Mobius. Z. Physik. Chem., 209 (1958) 298.) Referring to FIG. 1, the conventional fuel cell measurement apparatus 100 is capable of measuring electric characteristics of the solid oxide fuel cell 50, which is a three-layer structure comprising an electrolyte layer 56 sandwiched between a porous anode layer 52 and a porous cathode layer 54.

More particularly, the solid oxide fuel cell 50 is attached onto the ceramic tube 110 using ceramic glue (not shown). The solid oxide fuel cell 50 is placed into the furnace 120 with the ceramic tube 110 to be heated up. The furnace 120 comprises two openings (not labeled) so that the ceramic tube 110 and the anode ceramic gas pipe 130 are inserted into the furnace 120 from the bottom and the top, respectively. The cathode ceramic gas pipe 140 is inserted into the ceramic tube 110.

When hydrogen $H_2$ flows from the anode ceramic gas pipe 130 into the porous anode layer 52 and oxygen $O_2$ flows from the cathode ceramic gas pipe 140 into the porous cathode layer 54, chemical reaction takes place in the solid oxide fuel cell 50 to generate electric energy. Moreover, in the prior art, a platinum conductive wire (not shown) is directly sintered on the porous anode layer 52 and the porous cathode layer 54. Electric characteristics of the solid oxide fuel cell 50 are measured using the platinum conductive wire (not shown).

However, since the solid oxide fuel cell 50 is required to be attached with a platinum conductive wire sintered thereon before electric characteristics are measured, related processing steps are time-consuming and material cost is increased. Moreover, even though ceramic glue can be used to combine the ceramic tube 110 and the solid oxide fuel cell 50 to achieve sealing. However, since the coefficient of thermal expansion of ceramic glue is not matched with that of the solid oxide fuel cell 50, cracks may appear in the solid oxide fuel cell 50. Moreover, in the prior art, after measurement, the ceramic glue has to be destructed before the solid oxide fuel cell 50 can be demounted. Therefore, the solid oxide fuel cell 50 cannot be re-attached onto the ceramic tube 110.

Figure 2A:
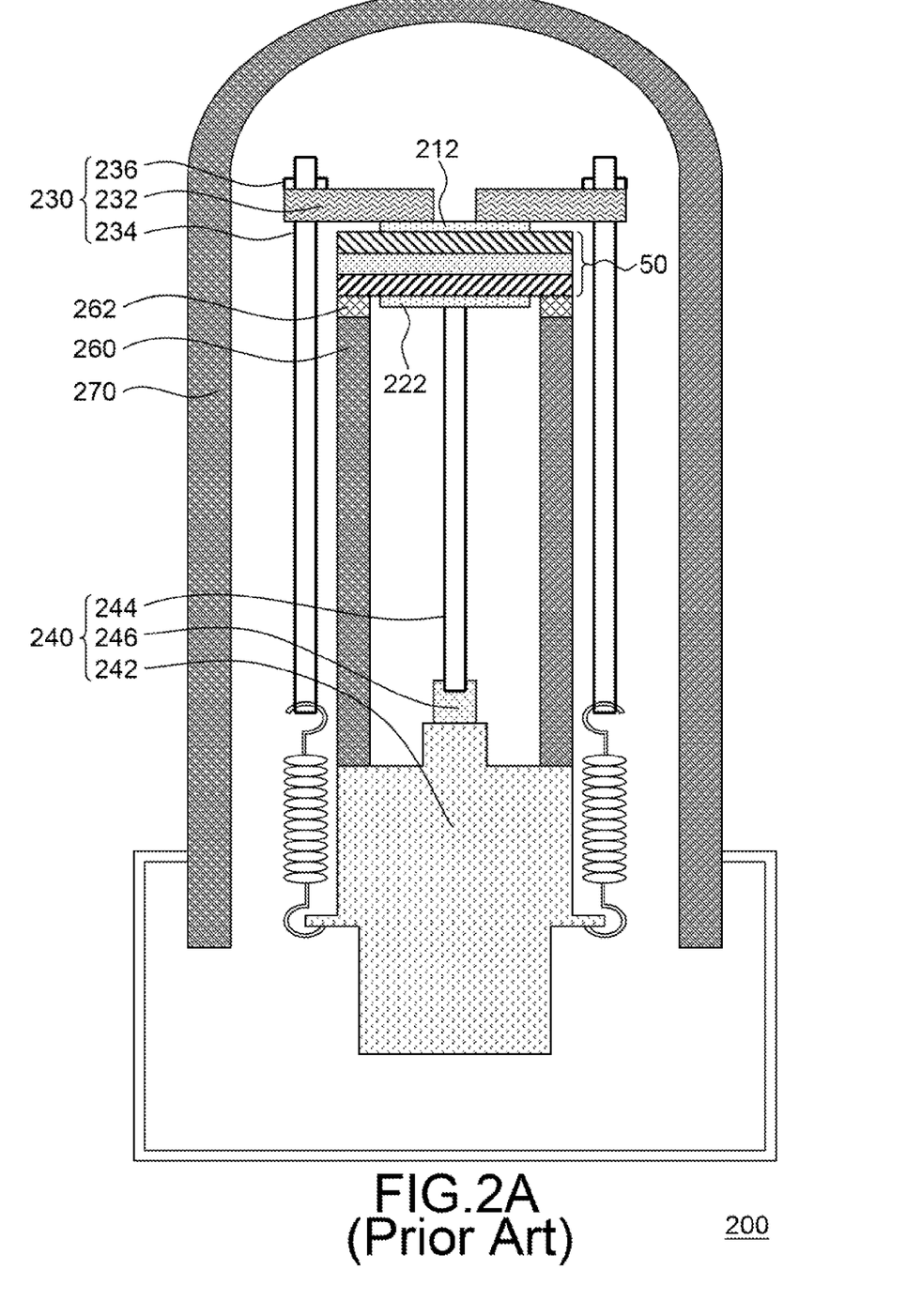
FIG. 2A and FIG. 2B are cross-sectional views of another conventional fuel cell measurement apparatus.
Figure 2B:
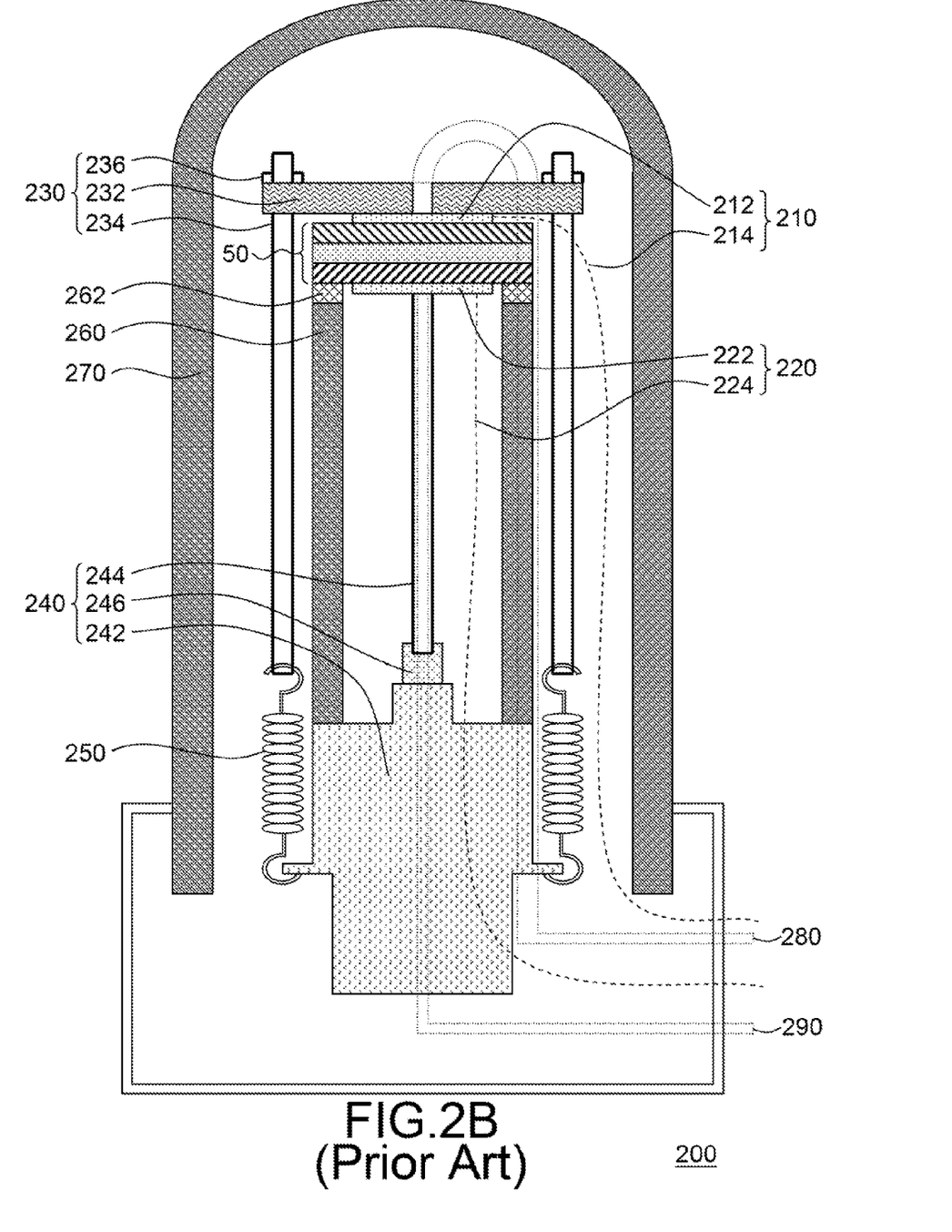

To overcome the foregoing problems, ProboStat (NorECs AS, Norway) discloses another fuel cell measurement apparatus as shown in FIG. 2A and FIG. 2B. For clarity, some elements are not shown in FIG. 2A. Instead, they are shown by dotted lines in FIG. 2B. Referring to FIG. 2A and FIG. 2B, the conventional fuel cell measurement apparatus 200 comprises a first current collecting unit 210, a second current collecting unit 220, a top holding set 230, a bottom holding set 240 and a spring 250. The top holding set 230 and the bottom holding set 240 are pulled by a spring 250 so that the solid oxide fuel cell 50 is clipped by the top current collecting unit 210 and the bottom current collecting unit 220. The top current collecting unit 210 and the bottom current collecting unit 220 prevent sintering and sealing on the solid oxide fuel cell 50 so that the solid oxide fuel cell 50 is re-usable.

More particularly, the first current collecting unit 210 comprises a first platinum conductive mesh 212 and a first platinum conductive wire 214. The first platinum conductive wire 214 is sintered on the first platinum conductive mesh 212. Similarly, the second current collecting unit 220 comprises a second platinum conductive mesh 222 and a second platinum conductive wire 224. The second platinum conductive wire 224 is sintered on the second platinum conductive mesh 222.

The first current collecting unit 210 and the second current collecting unit 220 are pressed against a porous anode layer (not labeled) and a porous cathode layer (not labeled) on the solid oxide fuel cell 50 for measuring electric characteristics of the solid oxide fuel cell 50. Moreover, the solid oxide fuel cell 50 is clipped by the first current collecting unit 210 and the second current collecting unit 220 using a top holding set 230, a bottom holding set 240 and a spring 250.

More particularly, the fuel cell measurement apparatus 200 further comprises an inner ceramic supporting tube 260 and an outer ceramic tube 270. The solid oxide fuel cell 50 is supported by the inner ceramic supporting tube 260 disposed inside the outer ceramic tube 270 to form two hermetically sealed rooms. To improve hermetic ness, in the prior art, a sealing washer 262 is disposed between the inner ceramic supporting tube 260 and the solid oxide fuel cell 50.

The bottom holding set 240 comprises a base 242 and a ceramic shaft 244. The inner ceramic supporting tube 260 is disposed on the base 242. The ceramic shaft 244 is disposed on the base 242 to support the second platinum conductive mesh 222 so that the second platinum conductive mesh 222 is tightly attached onto the solid oxide fuel cell 50. In the prior art, to keep the upward force in balance, a silicone tube 246 is further disposed between the base 242 and the ceramic shaft 244.

The top holding set 230 comprises a ceramic plate 232 and a ceramic shaft 234. The ceramic plate 232 presses the first platinum conductive mesh 212 downward so that the first platinum conductive mesh 212 is tightly attached onto the solid oxide fuel cell 50. The ceramic shaft 234 fixedly penetrates the ceramic plate 232 by use of a smaller ceramic shaft 236.

Moreover, the spring 250 is connected between the ceramic shaft 234 and the base 242 to pull the top holding set 230 and the bottom holding set 240. Accordingly, the top holding set 230 and the bottom holding set 240 tightly press the first platinum conductive mesh 212 and the second platinum conductive mesh 222 to clip the solid oxide fuel cell 50 to form two hermetically sealed rooms. In the solid oxide fuel cell 50, a current induced by chemical reaction can be introduced through the first platinum conductive mesh 212 and the second platinum conductive mesh 222.

Referring to FIG. 2A and FIG. 2B, the fuel cell measurement apparatus 200 further comprises a first gas pipe 280 and a second gas pipe 290. The first gas pipe 280 is connected to an opening (not labeled) in the ceramic plate 232 so that hydrogen $H_2$ passes through the first platinum conductive mesh 212 to the solid oxide fuel cell 50, while the second gas pipe 290 penetrates the ceramic shaft 244 so that oxygen $O_2$ passes through the first platinum conductive mesh 212 into the solid oxide fuel cell 50. Accordingly, the solid oxide fuel cell 50 is capable of converting chemical energy into electric energy that is introduced by the first platinum conductive wire 214 and the second platinum conductive wire 224.

However, the fuel cell measurement apparatus 200 has disadvantages such as:

1. The contacts between the solid oxide fuel cell 50 and the first current collecting unit 210 and the second current collecting unit 220 determine the contact resistances that strongly influence the output power of the solid oxide fuel cell 50. For the second current collecting unit 220, only the second platinum conductive mesh 222 is supported so that the contact area between the second current collecting unit 220 and the solid oxide fuel cell 50 is insufficient. Therefore, the output current is blocked and the cell performance is limited.

2. After hydrogen $H_2$ and oxygen $O_2$ flow from the first gas pipe 280 and the second gas pipe 290, the gas distribution is not uniform because there is no gas path. As a result, the energy generated by the solid oxide fuel cell 50 is not uniform and thermal stress occurs due to non-uniform temperature distribution, which leads to cracks in the solid oxide fuel cell 50.

3. The second platinum conductive mesh 222 is often out of shape and destructed because the ceramic shaft 244 supports the second platinum conductive mesh 222. Therefore, the second platinum conductive mesh 222 cannot be re-used. Moreover, if ceramic shaft 244 is not disposed properly or obliquely supports the second platinum conductive mesh 222, the solid oxide fuel cell 50 may be damaged.

4. In the prior art, the pulling force of the spring 250 is a constant that cannot be adjusted. Therefore, when the thickness of the solid oxide fuel cell 50 varies, the applied pulling force from the spring 250 will be different, which leads to poor condition consistency of cell measurement. Moreover, in the prior art, the pulling force of the spring 250 is a constant. If the mechanical strength of the tested solid oxide fuel cell 50 varies, it may cause damage to the solid oxide fuel cell 50 since the pulling force of the spring 50 is too large when solid oxide fuel cell 50 is installed or measured. On the contrary, if the pulling force of the spring 250 is too small, the first current collecting unit 210 and the second current collecting unit 220 cannot tightly contact the solid oxide fuel cell 50 to result in larger resistance. Moreover, since the base 242 is hooked by the spring 250, there is risk that the hook may be loosen so that the ceramic shaft 234 or even the solid oxide fuel cell 50 cracks due to collision. In this case, the solid oxide fuel cell 50 cannot be demounted and re-used.

5. The first gas pipe 280 and the second gas pipe 290 are not equipped with a pressure meter so that the anode pressure and the cathode pressure cannot be monitored. Therefore, gas leakage occurs due to unbalanced pressure and error in measurement results from non-uniform reactive gas concentrations.

SUMMARY OF THE INVENTION

It is an object of the present invention to provide a fuel cell measurement apparatus capable of measuring electric characteristics of a solid oxide fuel cell with ease in re-using and assembling of the elements.

In order to achieve the foregoing and other objects, in one embodiment, the present invention provides a fuel cell measurement apparatus capable of measuring electric characteristics of a solid oxide fuel cell, the fuel cell measurement apparatus comprising a first current collecting unit, a second current collecting unit, a top holding set, a bottom holding set and an adjustable elastic load set. The solid oxide fuel cell is clipped by the first current collecting unit and the second current collecting unit. The top holding set is capable of fixing the first current collecting unit, while the bottom holding set is capable of fixing the second current collecting unit. The adjustable elastic load set is connected to the top holding set and the bottom holding set to adjust the tension between the top holding set and the bottom holding set.

Accordingly, the first current collecting unit comprises a first porous plate, a first conductive mesh and a first conductive wire. The first porous plate comprises a first through hole and a first gas channel communicating with each other. The first conductive mesh is sintered on the first porous plate, while the first conductive wire is coupled to the first conductive mesh. Similarly, the second current collecting unit comprises a second porous plate, a second conductive mesh and a second conductive wire. The second porous plate comprises a second through hole and a second gas channel communicating with each other. The second conductive mesh is sintered on the second porous plate, while the second conductive wire is coupled to the second conductive mesh.

In one embodiment of the present invention, the first porous plate and the second porous plate are ceramic plates comprising aluminum oxide or zirconium oxide.

In one embodiment of the present invention, the first conductive mesh and the second conductive mesh comprise, for example, platinum, gold or silver.

In one embodiment of the present invention, the first gas channel and the second gas channel are arranged in a radial shape or an array shape. Moreover, the first through hole is capable of enabling a first reactive gas to pass through, and the second through hole is capable of enabling a second reactive gas to pass through. The first porous plate is fixed in the fixing element, and the connecting shafts are connected to the fixing element on one end and connected to the adjustable elastic load set on the other end. Moreover, the top holding set further comprises a plurality of fixing pins, each penetrating one corresponding connecting shaft so that the connecting shaft is fixed in the fixing element on one end. Moreover, the fixing elements are, for example, ceramic plates, the connecting shafts are, for example, ceramic shafts, and the fixing pins are smaller ceramic shafts.

In one embodiment of the present invention, the bottom holding set comprises a base, a support and a buffer. The support is capable of supporting the second porous plate. The buffer is disposed between the base and the support. Moreover, the buffer comprises a second elastic element and a silicone tube. The second elastic element is connected between the base and the support, and the silicone tube wraps the second elastic element. Moreover, the support is a ceramic shaft, and the second elastic element is a spring.

In one embodiment of the present invention, the fuel cell measurement apparatus further comprises an inner ceramic supporting tube and a sealing washer. The inner ceramic supporting tube is connected to the base on one end and supporting the solid oxide fuel cell on the other end. The sealing washer is disposed between the inner ceramic supporting tube and the solid oxide fuel cell.

In one embodiment of the present invention, the adjustable elastic load set comprises a fixing ring, a plurality of displacement elements and a plurality of first elastic elements. The fixing ring is disposed around the bottom holding set. The displacement elements are disposed on the fixing ring and capable of moving with respect to the fixing ring. Each of the first elastic elements is connected to one corresponding displacement element on one end and connected to the top holding set on the other end.

Moreover, the fixing ring has one screw hole corresponding to each of the displacement elements. Each displacement element comprises a screw shank and a screw nut. The screw shank is disposed by rotating into the corresponding screw hole to adjust the position with respect to the fixing ring, and the screw nut is disposed by rotating around the screw shank to fix the position of the screw shank with respect to the fixing ring. Moreover, the first elastic element is, for example, a spring.

In one embodiment of the present invention, the fuel cell measurement apparatus further comprises a first gas pipe, a first pressure meter, a second gas pipe and a second pressure meter. The first gas pipe is connected between the first through hole and the first pressure meter, while the second gas pipe is connected between the second through hole and the second pressure meter.

As stated above, in the fuel cell measurement apparatus of the present invention, the adjustable elastic load set adjusts the tension between the top holding set and the bottom holding set to clip the solid oxide fuel cell with a proper pressure to measure electric characteristics.

Moreover, the gas channel of the porous plate is designed so that the reactive gas is distributed more uniform to help the measurement of the electric characteristics of the solid oxide fuel cell. Moreover, the conductive mesh is sintered on the porous plate to prevent the conductive mesh from elastic fatigue and improve the contact between the conductive mesh and the solid oxide fuel cell.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The present invention can be exemplified but not limited by the embodiments as described hereinafter.

Figure 3A:
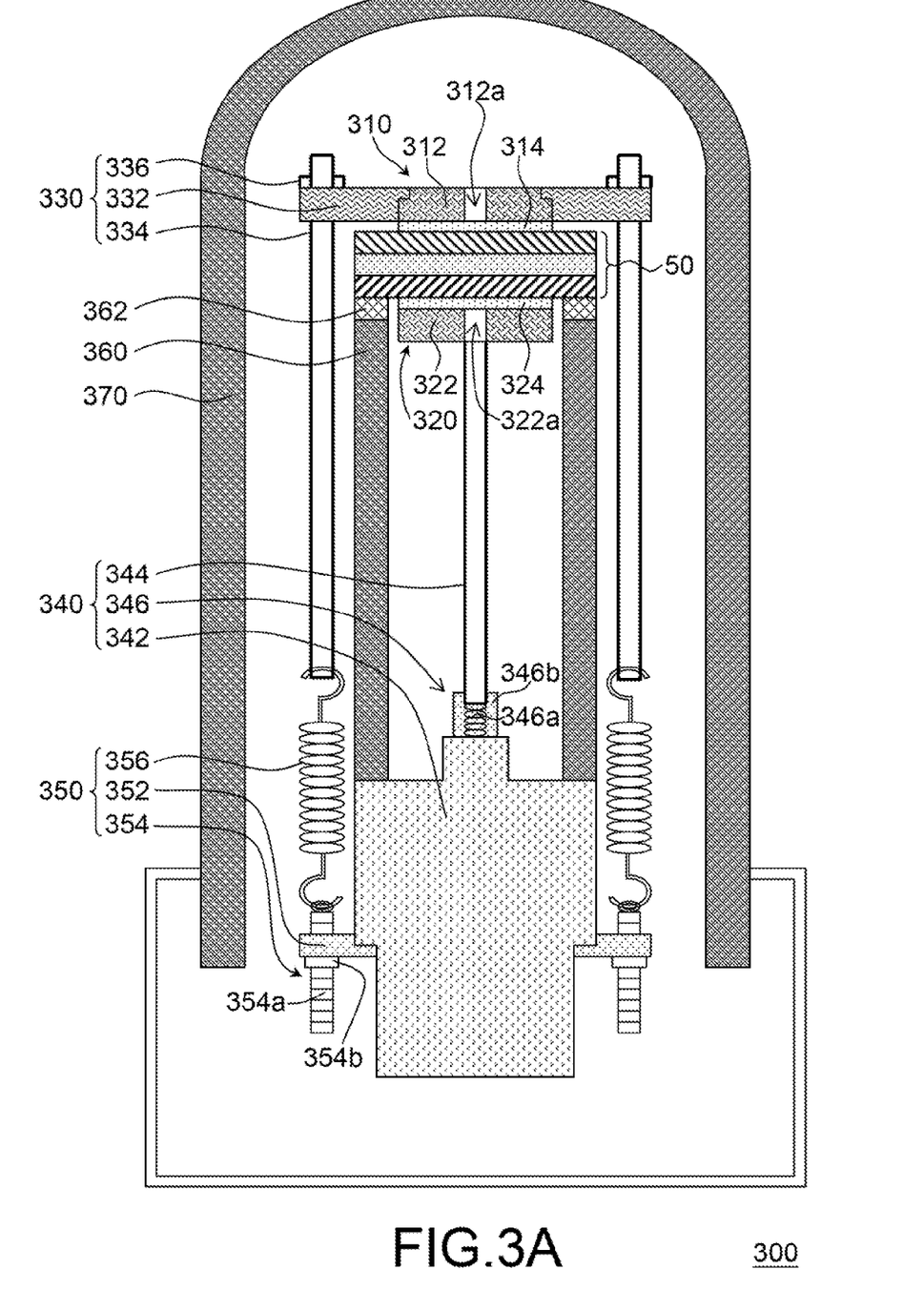
FIG. 3A and FIG. 3B are cross-sectional views of a fuel cell measurement apparatus according to one embodiment of the present invention.
Figure 3B:
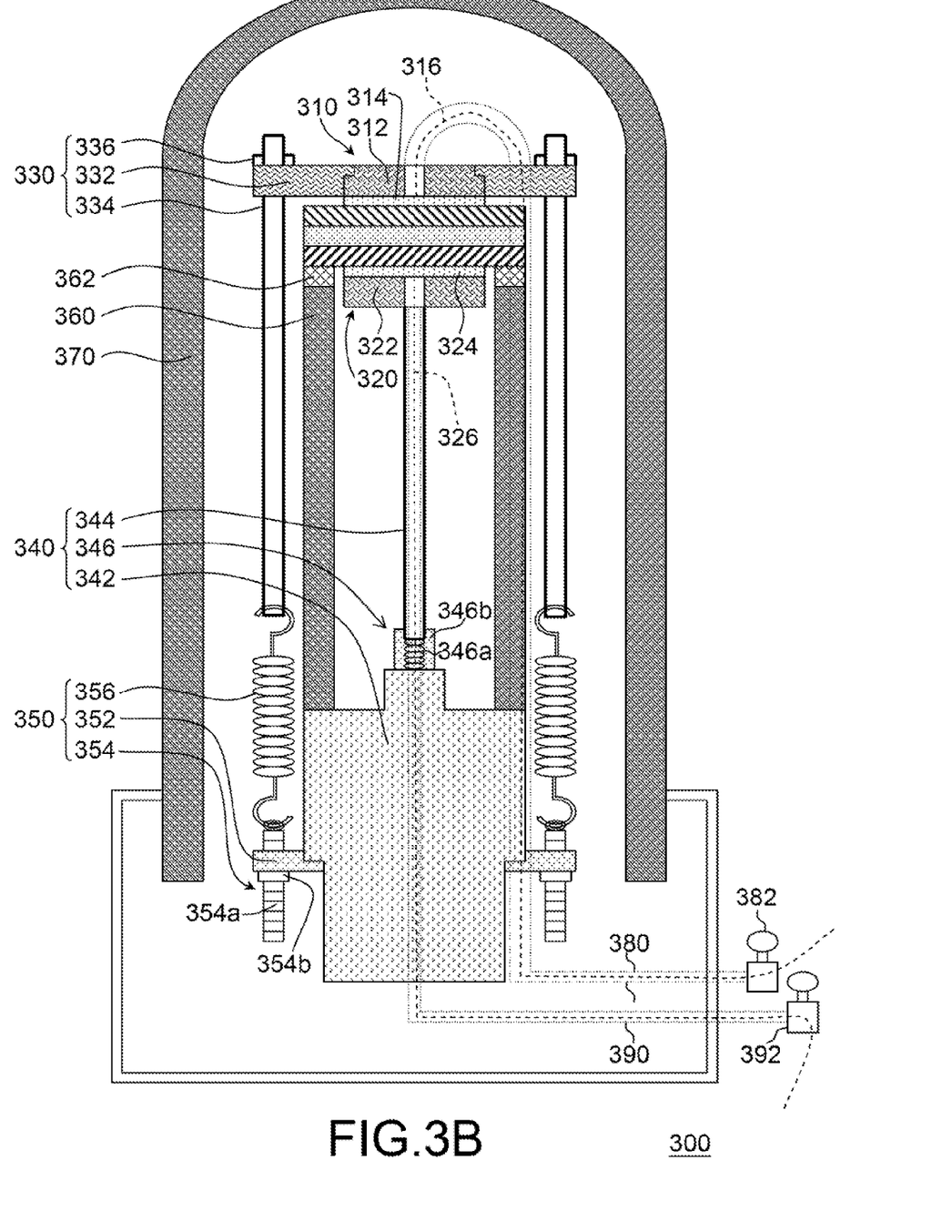

FIG. 3A and FIG. 3B are cross-sectional views of a fuel cell measurement apparatus according to one embodiment of the present invention. For clarity, some elements are not shown in FIG. 3A. Instead, they are shown by dotted lines in FIG. 3B. Referring to FIG. 3A and FIG. 3B, the fuel cell measurement apparatus 300 of the present invention is capable of measuring electric characteristics of the solid oxide fuel cell 50 and comprises a first current collecting unit 310, a second current collecting unit 320, a top holding set 330, a bottom holding set 340 and an adjustable elastic load set 350. The solid oxide fuel cell 50 is clipped by the first current collecting unit 310 and the second current collecting unit 320. The top holding set 330 is capable of fixing the first current collecting unit 310, and the bottom holding set 340 is capable of fixing the second current collecting unit 320. The adjustable elastic load set 350 is connected to the top holding set 330 and the bottom holding set 340 to adjust the tension between the top holding set 330 and the bottom holding set 340. In other words, by the use of the adjustable elastic load set 350 of the present invention, the first current collecting unit 310 and the second current collecting unit 320 can be tightly attached onto the solid oxide fuel cell 50 so accurately measure electric characteristics of the solid oxide fuel cell 50. All these elements will be described in detail hereinafter.

Figure 4A:
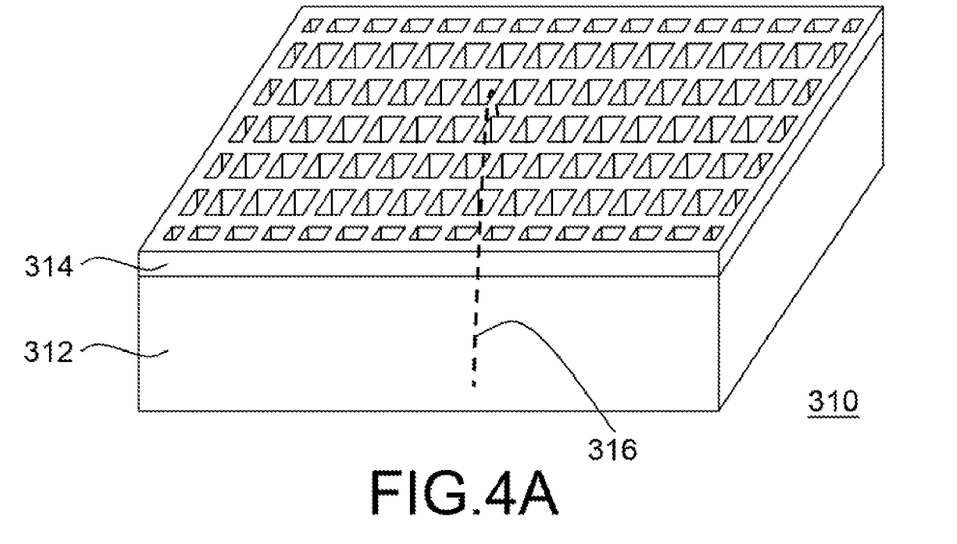
FIG. 4A and FIG. 4B are a 3-D view and a top view, respectively, of a first current collecting unit in FIG. 3A.
Figure 4B:
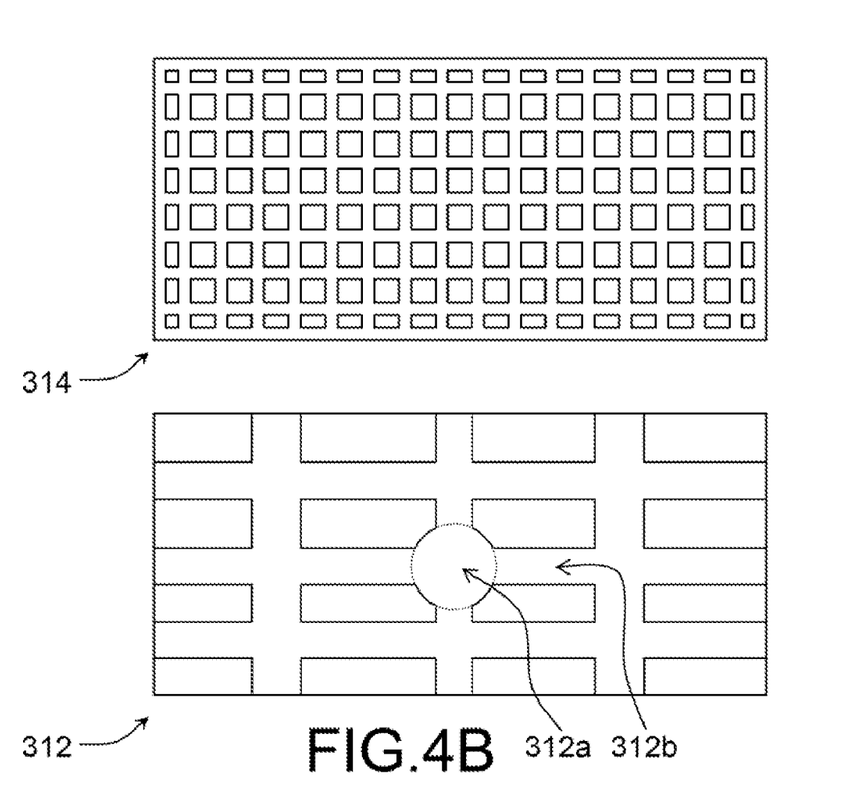

FIG. 4A and FIG. 4B are a 3-D view and a top view, respectively, of a first current collecting unit in FIG. 3A. Referring to FIG. 4A and FIG. 4B, the first current collecting unit 310 of the present embodiment comprises a first porous plate 312, a first conductive mesh 314 and a first conductive wire 316. The first porous plate 312 comprises a first through hole 312a and a first gas channel 312b communicating with each other. The first gas channel 312b is disposed on a surface facing the first conductive mesh 314.

Referring to FIG. 3A and FIG. 3B, after a first reactive gas (not shown) passes through the first through hole 312a, the first reactive gas is distributed uniformly on the porous plate 312 along the first gas channel 312b. Then, the first reactive gas diffuses uniformly towards the first conductive mesh 314 into a porous anode layer (not labeled) of the solid oxide fuel cell 50.

Figure 4C:
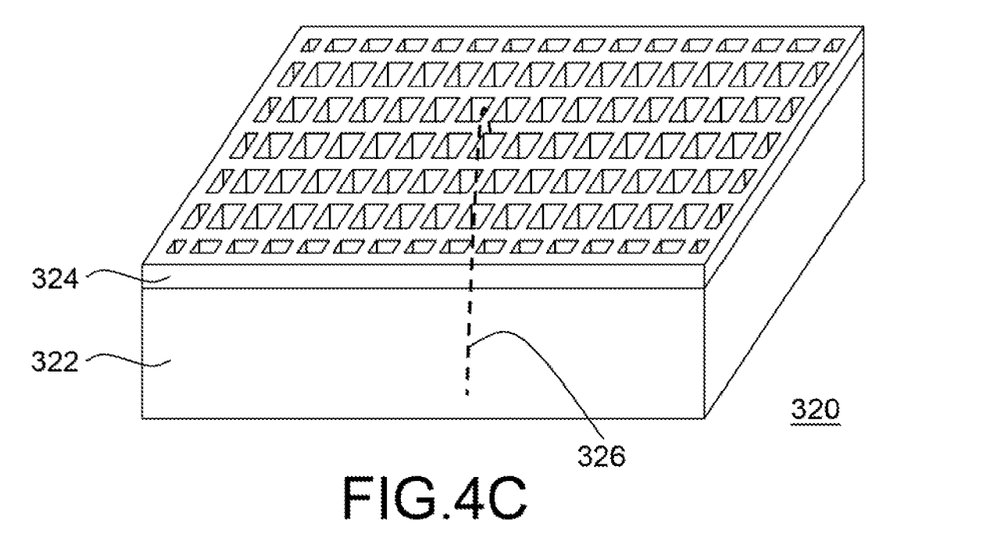
FIG. 4C and FIG. 4D are a 3-D view and a top view, respectively, of a second current collecting unit in FIG. 3A.
Figure 4D:
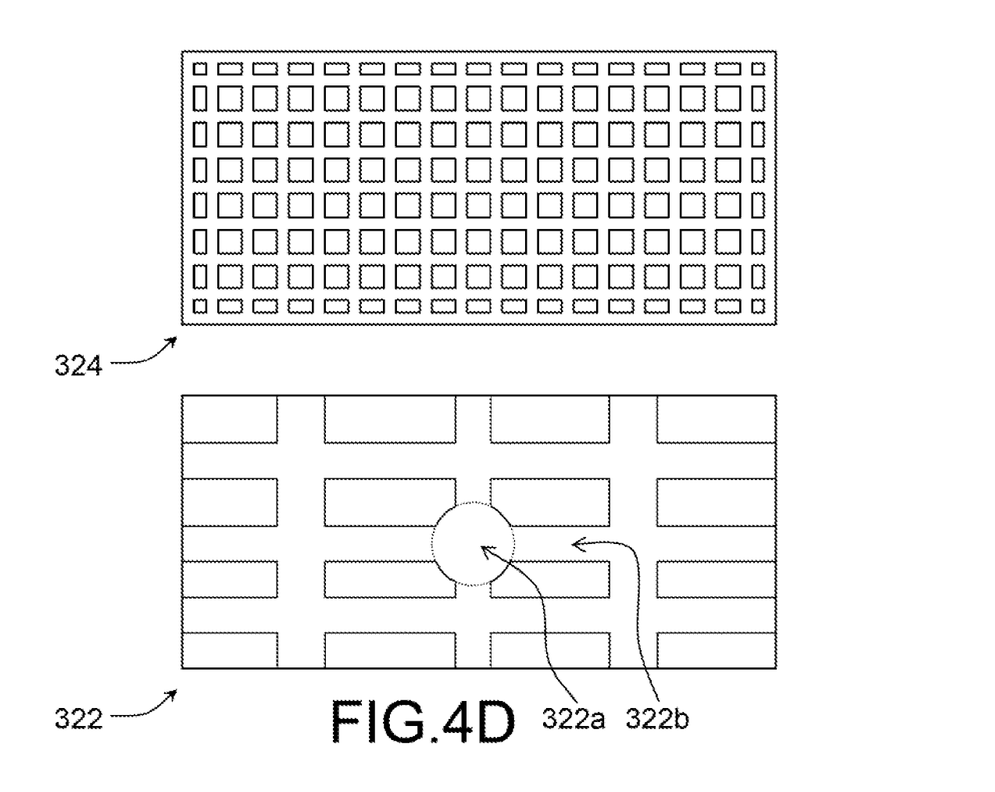

FIG. 4C and FIG. 4D are a 3-D view and a top view, respectively, of a second current collecting unit in FIG. 3A. Referring to FIGS. 4C and 4D, the second current collecting unit 320 is similar to the first current collecting unit 310, and anyone with ordinary skill in the art can understand that the second current collecting unit 320 comprises a second porous plate 322, a second conductive mesh 324 and a second conductive wire 326. The second porous plate 322 comprises a second through hole 322a and a second gas channel 322b communicating with each other.

Similarly, after a second reactive gas (not shown) passes through the second through hole 322a, the second gas channel 322b is distributed uniformly on the porous plate 312. Then, the second reactive gas diffuses uniformly towards the second conductive mesh 324 into a porous cathode layer (not shown) of the solid oxide fuel cell 50.

In the present embodiment, the first reactive gas is, for example, hydrogen $H_2$, and the second reactive gas is, for example, oxygen $O_2$ or air. However, the present invention is not limited to the above examples of the first reactive gas and second reactive gas. The first reactive gas and the second reactive gas are implemented according to the solid oxide fuel cell 50, which is readily understood by anyone with ordinary skill in the art.

Accordingly, chemical reaction takes place in the solid oxide fuel cell 50 to generate electric energy, which is introduced by the first conductive wire 316 and the second conductive wire 326. The first conductive wire 316 is coupled to the first conductive mesh 314, and the second conductive wire 326 is coupled to the second conductive mesh 324.

By the gas path design for the first gas channel 312b and the second gas channel 314b in the present invention, the first reactive gas and the second reactive gas uniformly enter the solid oxide fuel cell 50 to experience chemical reaction to improve the uniformity of energy generation and temperature distribution in the solid oxide fuel cell 50 to prevent thermal stress that causes damage to the solid oxide fuel cell 50.

Moreover, in the present invention, the first conductive mesh 314 is directly sintered on the first porous plate 312, and the second conductive mesh 324 is directly sintered on the second porous plate 322. More particularly, the first porous plate 312 and second porous plate 322 are coated with an electric conductive adhesive so as to be attached onto the first conductive mesh 314 and the second conductive mesh 324, respectively, and are then sintered so that the first conductive mesh 314 and the first porous plate 312 are formed as one and the second conductive mesh 324 and the second porous plate 322 are formed as one. Then, the first porous plate 312 and second porous plate 322 are soldered with the first conductive wire 316 and the second conductive wire 326, respectively.

Accordingly, as the solid oxide fuel cell 50 is clipped by the first conductive mesh 314 and the second conductive mesh 324, most of the stress is released by the first porous plate 312 and the second porous plate 322 so as to prevent the first conductive mesh 314 and second conductive mesh 324 from being out of shape.

In other words, in the present invention, the first current collecting unit 310 and the second current collecting unit 320 are re-usable to reduce the cost of using the fuel cell measurement apparatus 300. Moreover, the first conductive mesh 314 and the second conductive mesh 324 are entirely attached onto the solid oxide fuel cell 50 to significantly improve the actual contact areas on the first current collecting unit 310 and the second current collecting unit 320 corresponding to the solid oxide fuel cell 50 for measuring the performance of the solid oxide fuel cell 50.

In the present embodiment, the first porous plate 312 and the second porous plate 322 are, for example, ceramic plates and comprise aluminum oxide or zirconium oxide. Moreover, the first conductive mesh 314, the second conductive mesh 324, the first conductive wire 316 and the second conductive wire 326 comprise, for example, platinum, gold or silver. However, the present invention is not limited to the above examples of the elements and materials.

Moreover, in the present embodiment, one ends of the first conductive wire 316 and the second conductive wire 326 can be sintered on the first conductive mesh 314 and the second conductive mesh 324, respectively, while the other ends of the first conductive wire 316 and the second conductive wire 326 penetrate the first through hole 312a and second through hole 322a, respectively, to be connected to meters such as a current meter. However, the present invention is not limited to the coupling from the first conductive wire 316 and the second conductive wire 326 to the first conductive mesh 314 and the second conductive mesh 324, respectively.

Figure 4E:
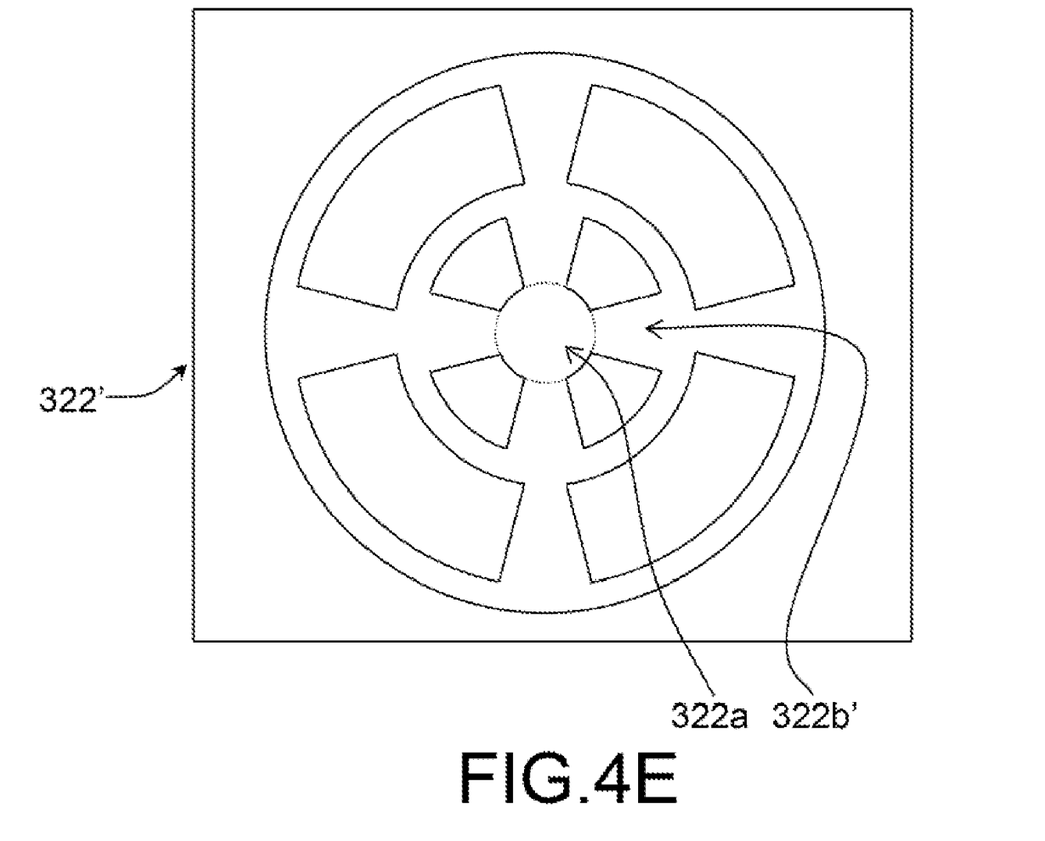
FIG. 4E is a top view of a first porous plate according to another embodiment of the present invention.

In the present embodiment, the first gas channel 312b is a groove on the first porous plate 312 and is arranged in an array shape. However, the present invention is not limited to the arrangement of the first gas channel 312b. For example, in FIG. 4E, the first gas channel 312b' on the first porous plate 312' is in a radial shape, which is readily understood by anyone with ordinary skill in the art. The object of the first gas channel is to enable the first reactive gas to pass through the first through hole and distribute uniformly on the first porous plate. Certainly, the second gas channel 322b can be arranged in any other shape, which is not described herein.

Referring to FIG. 3A and FIG. 3B, in the present embodiment, the top holding set 330, the bottom holding set 340 and the adjustable elastic load set 350 are described in detail hereinafter. It is noted that, the top holding set 330 fixes the first current collecting unit 310, the bottom holding set 340 fixes the second current collecting unit 320, and the adjustable elastic load set 350 adjusts the tension between the top holding set 330 and the bottom holding set 340. The description herein is only exemplifying, anyone with ordinary skill in the art can make modifications according to the description within the scope of the present invention.

More particularly, the top holding set 330 comprises a fixing element 332, a plurality of connecting shafts 334 and a plurality of fixing pin 336. The number of connecting shafts 334 is 3. These 3 connecting shafts are arranged symmetrically with respect to the center (only two are shown in the figures). The first porous plate 312 is lodged in the fixing element 332 so that they are fixedly connected. The connecting shaft 334 penetrates the fixing element 332 and the fixing pin 336 perpendicularly on one end so that the connecting shaft 334 is fixed with the fixing element 332. Moreover, the connecting shaft 334 is connected to the adjustable elastic load set 350 on the other end so that the top holding set 330 pulls the first current collecting unit 310 upward to the solid oxide fuel cell 50.

In the present embodiment, the fixing element 332 is, for example, a ceramic plate. The connecting shafts 334 are, for example, ceramic shafts. The fixing pins are, for example, smaller ceramic shafts 336. However, the present invention is not limited to the above elements that form the top holding set 330. For example, the top holding set 330 can only comprise the fixing element 332 and the connecting shafts 334, while the fixing element 332 and the connecting shafts 334 are, for example, formed as one to do without the fixing pins 336.

The bottom holding set 340 comprises a base 342, a support 344 and a buffer 346. The support 344 supports the second porous plate 322. The buffer 346 is disposed between the base 342 and the support 346. The base 342 is connected to the adjustable elastic load set 350 so that the bottom holding set 340 upholds the second current collecting unit 320 to support the solid oxide fuel cell 50.

Moreover, the buffer 346 comprises a second elastic element 346a and a silicone tube 346b. The second elastic element 346a is connected between the base 342 and the support 344 and is wrapped around by the silicone tube 346b. Compared with the prior art, the buffer 346 with the second elastic element 346a prevents the support 344 from obliquely supporting the second porous plate 322. Therefore, the reliability of the fuel cell measurement apparatus 300 is enhanced.

Moreover, in the present embodiment, the support 344 is a ceramic shaft, and the second elastic element 346a is a spring.

Referring to FIG. 3A and FIG. 3B, similar to the prior art, the fuel cell measurement apparatus 300 of the present embodiment further comprises an inner ceramic supporting tube 360 and an outer ceramic tube 370. The solid oxide fuel cell 50 is supported upon the inner ceramic supporting tube 360, which is disposed inside the outer ceramic tube 370 to form two hermetically sealed rooms to heat up the solid oxide fuel cell 50.

It is noted that, to strengthen the sealing, in the present embodiment, a sealing washer 362 is provided between the inner ceramic supporting tube 360 and the solid oxide fuel cell 50. The sealing washer 362 is, for example, a mica sheet.

The adjustable elastic load set 350 comprises a fixing ring 352, a plurality of displacement elements 354 and a plurality of first elastic elements 356. The number of displacement elements 354 and the number of first elastic elements 356 are determined according to the number of connecting shafts 334. In the present embodiment, the numbers of displacement elements 354, first elastic elements 356 and connecting shafts 334 are all 3 and arranged symmetrically with respect to the center. However, the present invention is not limited to the numbers of these elements. Alternatively, the numbers can be 2, 4, or 6 as long as they are arranged symmetrically with respect to the center.

The fixing ring 352 is disposed around the base 342 of the bottom holding set 340. The displacement elements 354 are disposed on the fixing ring 352 and are capable of moving with respect to the fixing ring 352. Each of the first elastic elements 356 is connected to one corresponding displacement element 354 on one end and is connected to one connecting shaft 334 of the top holding set 330 on the other end. Accordingly, the first elastic elements 356 pull between the top holding set 330 and the bottom holding set 340 and adjust the pulling force according to the displacement of the displacement elements 354. The first elastic elements 356 are, for example, springs. The fixing ring 352 can be made of stainless steel.

More particularly, the fixing ring 352 comprises screw holes (not shown) corresponding to the displacement elements 354. The displacement elements 354 comprise a screw shank 354a and a screw nut 354b. The screw shank 354a is disposed by rotating into the corresponding screw hole 354b to adjust the position with respect to the fixing ring 352. The screw nut 354b is disposed by rotating around the screw shank 354a to fix the position of the screw shank 354a with respect to the fixing ring 352.

In other words, the screw shanks 354b with threads are disposed in the screw holes and then the first elastic elements 356 are disposed on the top end of the screw shanks 354b. When the screw shanks 354b penetrate the screw holes on the fixing ring 352, the screw nuts 354b are disposed around the screw shanks 354b by rotating them on the screw shanks 354b. Therefore, the extending length of the first elastic elements 356 can be adjusted according to the loading force that depends on the pressure from the top holding set 330 and the support from bottom holding set 340.

Accordingly, in the present invention, the position of the displacement elements 354 with respect to the fixing ring 352 can be respectively adjusted according to the thickness of the solid oxide fuel cell 50 to adjust the pulling force from the first elastic elements 356 to control the measuring quality. In other words, by adjusting the pulling force from the first elastic elements 356, cracks on the solid oxide fuel cell 50 when the pulling force is too large or poor hermetic ness at the contacts between the current collecting units 310, 320 and the solid oxide fuel cell 50 when the pulling force is too small can be prevented.

Referring to FIG. 3A and FIG. 3B, the fuel cell measurement apparatus 300 in the present embodiment further comprises a first gas pipe 380, a first pressure meter 382, a second gas pipe 390 and a second pressure meter 392. The first gas pipe 380 is connected between the first through hole 312a and the first pressure meter 382, and the second gas pipe 390 is connected between the second through hole 322a and the second pressure meter 392. By the use of the first pressure meter 382 and the second pressure meter 392, the pressure values of the first reactive gas and the second reactive gas can be adjusted to prevent gas leakage occurs due to unbalanced pressure and error in measurement resulting from non-uniform reactive gas concentrations to effectively improve measuring accuracy of electric characteristics.

Figure 5A:
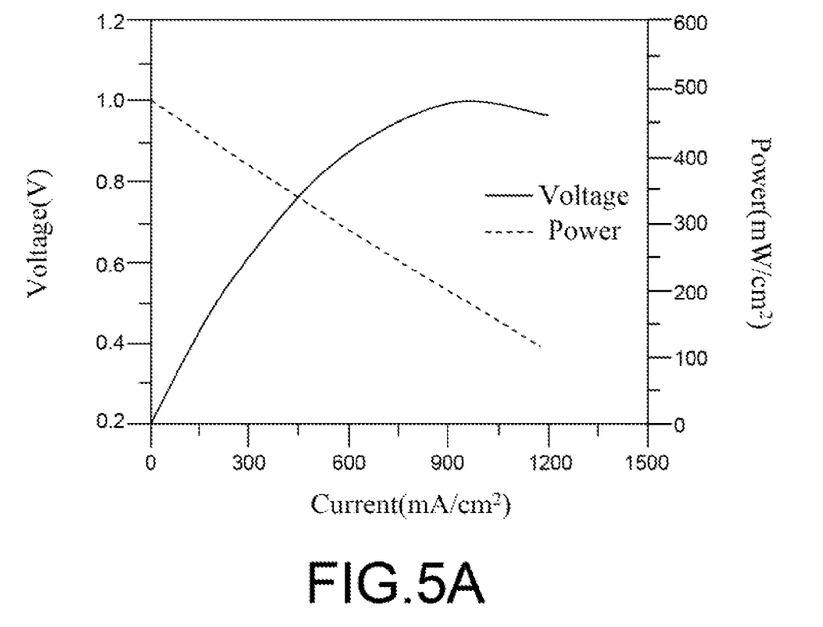
FIG. 5A and FIG. 5B show experimental results of a solid oxide fuel cell by a fuel cell measurement apparatus according to one embodiment of the present invention.
Figure 5B:
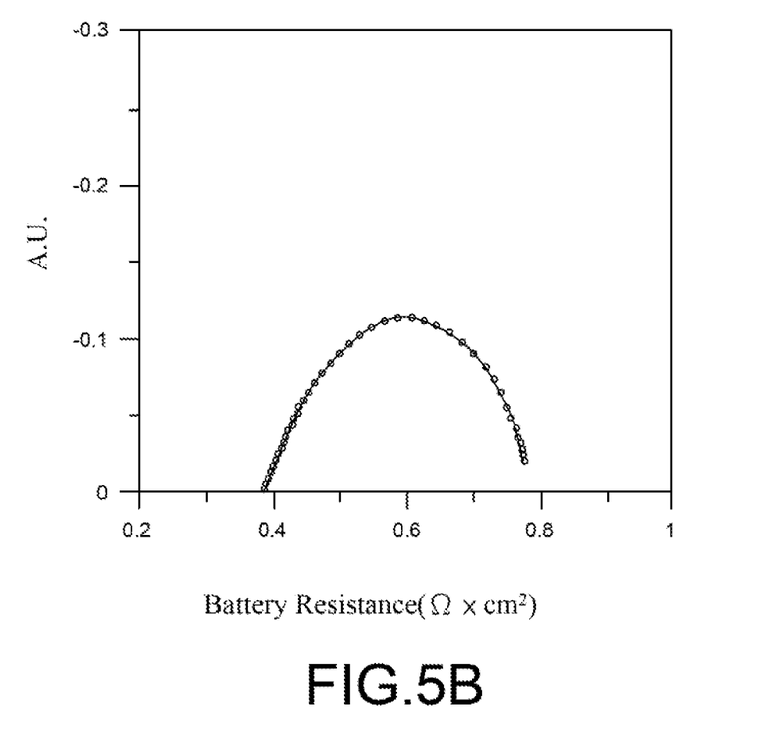

FIG. 5A and FIG. 5B show experimental results of a solid oxide fuel cell by a fuel cell measurement apparatus according to one embodiment of the present invention. The flow rate of hydrogen (the first reactive gas) and oxygen (the second reactive gas) is 300 cc/min and the temperature is under 800° C. FIG. 5A and FIG. 5B show the output power and AC impedance of a solid oxide fuel cell. Referring to FIG. 5A and FIG. 5B, the fuel cell measurement apparatus of the present invention is capable of measuring electric characteristics of the solid oxide fuel cell.

As stated above, the fuel cell measurement apparatus of the present invention at least comprises advantages of:

1. Since the conductive mesh is sintered on the porous plate and pressed against the solid oxide fuel cell by the adjustable elastic load set, the contact area can be increased to reduce the contact resistance, uniform the energy generation distribution from the solid oxide fuel cell and effectively increase the output power from the fuel cell.

2. Accordingly, after the measurement is done, the solid oxide fuel cell can be demounted, and the conductive mesh will not be out of shape and can be re-used. Consequently, the cost of the fuel cell measurement apparatus is reduced.

3. With the use of the pressure meter to monitor the pressure gradient, gas leakage occurs due to unbalanced pressure and error in measurement resulting from non-uniform reactive gas concentrations can be prevented.

4. Since the gas channel is formed as a groove on the porous plate, the uniformity of reactive gas distribution can be enhanced to significantly improve the reliability in electric characteristics measurement.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A fuel cell measurement apparatus capable of measuring electric characteristics of a solid oxide fuel cell, the fuel cell measurement apparatus comprising:
   a first current collecting unit, comprising:
      a first porous plate comprising a first through hole and a first gas channel communicating with each other;
      a first conductive mesh sintered on the first porous plate;
      a first conductive wire coupled to the first conductive mesh;
   a second current collecting unit, wherein the solid oxide fuel cell is clipped by the first current collecting unit and the second current collecting unit, the second current collecting unit comprising:

a second porous plate comprising a second through hole and a second gas channel communicating with each other;

a second conductive mesh sintered on the second porous plate;

a second conductive wire coupled to the second conductive mesh;

a top holding set capable of fixing the first current collecting unit;

a bottom holding set capable of fixing the second current collecting unit; and an adjustable elastic load set connected to the top holding set and the bottom holding set and capable of adjusting the tension between the top holding set and the bottom holding set.

2. The fuel cell measurement apparatus as recited in claim 1, wherein the first porous plate and the second porous plate are ceramic plates.

3. The fuel cell measurement apparatus as recited in claim 2, wherein the first porous plate and the second porous plate comprise aluminum oxide or zirconium oxide.

4. The fuel cell measurement apparatus as recited in claim 1, wherein the first conductive mesh and the second conductive mesh comprise platinum, gold or silver.

5. The fuel cell measurement apparatus as recited in claim 1, wherein the first gas channel and the second gas channel are arranged in a radial shape or an array shape.

6. The fuel cell measurement apparatus as recited in claim 1, wherein the first through hole is capable of enabling a first reactive gas to pass through, and the second through hole is capable of enabling a second reactive gas to pass through.

7. The fuel cell measurement apparatus as recited in claim 1, wherein the top holding set comprises:
   a fixing element enabling the first porous plate to be fixed in the fixing element; and
   a plurality of connecting shafts connected to the fixing element on one end and connected to the adjustable elastic load set on the other end.

8. The fuel cell measurement apparatus as recited in claim 7, wherein the fixing element is a ceramic plate and the connecting shafts are ceramic shafts.

9. The fuel cell measurement apparatus as recited in claim 7, wherein the top holding set further comprises a plurality of fixing pins, each penetrating one corresponding connecting shaft so that the connecting shaft is fixed in the fixing element on one end.

10. The fuel cell measurement apparatus as recited in claim 9, wherein the fixing pins are smaller ceramic shafts.

11. The fuel cell measurement apparatus as recited in claim 1, wherein the bottom holding set comprises:
   a base;
   a support capable of supporting the second porous plate; and
   a buffer disposed between the base and the support.

12. The fuel cell measurement apparatus as recited in claim 11, wherein the support is a ceramic shaft.

13. The fuel cell measurement apparatus as recited in claim 12, wherein the buffer comprises:
   a second elastic element connected between the base and the support; and
   a silicone tube wrapping the second elastic element.

14. The fuel cell measurement apparatus as recited in claim 13, wherein the second elastic element is a spring.

15. The fuel cell measurement apparatus as recited in claim 11, further comprising an inner ceramic supporting tube connected to the base on one end and supporting the solid oxide fuel cell on the other end.

16. The fuel cell measurement apparatus as recited in claim 15, further comprising a sealing washer disposed between the inner ceramic supporting tube and the solid oxide fuel cell.

17. The fuel cell measurement apparatus as recited in claim 1, wherein adjustable elastic load set comprises:
   a fixing ring disposed around the bottom holding set;
   a plurality of displacement elements disposed on the fixing ring and capable of moving with respect to the fixing ring; and
   a plurality of first elastic elements, each connected to one corresponding displacement element on one end and connected to the top holding set on the other end.

18. The fuel cell measurement apparatus as recited in claim 17, wherein the fixing ring has one screw hole corresponding to each of the displacement elements, each displacement element comprising:
   a screw shank disposed by rotating into the corresponding screw hole to adjust the position with respect to the fixing ring; and
   a screw nut disposed by rotating around the screw shank to fix the position of the screw shank with respect to the fixing ring.

19. The fuel cell measurement apparatus as recited in claim 17, wherein the first elastic element is a spring.

20. The fuel cell measurement apparatus as recited in claim 1, further comprising a first gas pipe and a first pressure meter, wherein the first gas pipe is connected between the first through hole and the first pressure meter.

21. The fuel cell measurement apparatus as recited in claim 1, further comprising a second gas pipe and a second pressure meter, wherein the second gas pipe is connected between the second through hole and the second pressure meter.

* * * * *